United States Patent [19]

Ishiguro et al.

[11] 4,129,370

[45] Dec. 12, 1978

[54] CONTROLLING CIRCUIT FOR ELECTRIC SHUTTERS

[75] Inventors: Yasuo Ishiguro; Kenji Wakazono, both of Tokyo, Japan

[73] Assignee: Copal Company Limited, Tokyo, Japan

[21] Appl. No.: 838,224

[22] Filed: Sep. 30, 1977

[30] Foreign Application Priority Data

Oct. 8, 1976 [JP] Japan .............................. 51-134866[U]
Oct. 8, 1976 [JP] Japan .............................. 51-134867[U]

[51] Int. Cl.² .............................................. G03B 9/62
[52] U.S. Cl. ...................................... 354/234; 354/51
[58] Field of Search ................. 354/50, 51, 60 R, 234, 354/235

[56] References Cited

U.S. PATENT DOCUMENTS 3,953,867 4/1976 Kondo .................................. 354/51
4,072,965 2/1978 Kondo .................................. 354/51

Primary Examiner—Michael L. Gellner
Attorney, Agent, or Firm—Cushman, Darby & Cushman

[57] ABSTRACT

A controlling circuit for electric shutters comprising at least one constant current circuit, a pair of capacitors to be charged in advance by a current source battery through the constant current circuit and a pair of driving coils to be energized in turn by discharge currents of the pair of capacitors to start a shutter blade opening motion and closing motion so that the current source battery of a comparatively small capacity may be effectively used.

5 Claims, 4 Drawing Figures

CONTROLLING CIRCUIT FOR ELECTRIC SHUTTERS

BACKGROUND OF THE INVENTION (a) Field of the Invention

The present invention relates to controlling circuits for electric shutters and more particularly to improvements in an electric circuit wherein a shutter blade opening motion and closing motion are made to be started respectively by a pair of electromagnets to be energized by discharge currents of capacitors.

(b) Description of the Prior Art

A conventional example of this kind of controlling circuit is shown in FIG. 1 in which symbol $E_0$ indicates a current source battery, $S_0$ indicates a current source switch, $L_1$ indicates a driving coil serving to start a shutter blade opening motion, $L_2$ indicates a driving coil serving to start a shutter blade closing motion, $C_1$ and $C_2$ indicate capacitors for respectively energizing the driving coils $L_1$ and $L_2$, $R_1$ and $R_2$ indicate resistors for respectively charging the capacitors $C_1$ and $C_2$, $D_1$ and $D_2$ indicate diodes for respectively preventing reverse flows, $T_1$ and $T_2$ indicate transistors to be respectively used as switching elements for connecting the coils $L_1$ and $L_2$ respectively to the capacitors $C_1$ and $C_2$, Rv and $C_3$ indicate respectively a variable resistor and a capacitor forming a CR delay circuit for controlling the exposure time and $S_1$ indicates a switch for starting the operation.

This circuit operates as follows. First of all, when the current source switch $S_0$ is closed, the capacitors $C_1$ and $C_2$ will be charged by the current source battery $E_0$ respectively through the diode $D_1$ and resistor $R_1$ and through the diode $D_2$ and resistor $R_2$. Then, when the switch $S_1$ is closed, the transistor $T_1$ will be on, a large electric current will be instantaneously fed to the driving coil $L_1$ from the capacitor $C_1$, a locking lever not illustrated will be moved by the energization of the driving coil $L_1$ and a shutter blade opening motion will be started. In such case, the current from the capacitor $C_1$ will be checked by the diode $D_1$ and therefore will not flow into the driving coil $L_2$. On the other hand, by the closing of the switch $S_1$, the transistor $T_3$ will be on, the transistor $T_4$ will be off and therefore charging the capacitor $C_3$ through the variable resistor Rv will be started. When a certain time, that is, a proper exposure time elapses, both transistors $T_5$ and $T_6$ will be on and the transistor $T_2$ will be on. Thereby, a large current will be instantaneously fed to the driving coil $L_2$ from the capacitor $C_2$ and the driving coil $L_2$ will be energized. By this energization of the driving coil $L_2$, a locking lever not illustrated will be moved and a shutter blade closing motion will be started. In such case, the current from the capacitor $C_2$ will be checked by the diode $D_2$ and therefore will not flow into the driving coil $L_1$.

According to the above mentioned conventional circuit, in case the capacitance of the capacitors $C_1$ and $C_2$ is C, the voltage of the current source battery $E_0$ is Vcc, the charge current is I and the voltage between the terminals of the capacitors $C_1$ and $C_2$ is Vc, the time t until charging the capacitors $C_1$ and $C_2$ is completed will be represented by the formula $$t = \frac{Vcc \cdot C}{I} \cdot \log e \left(1 - \frac{Vc}{Vcc}\right) \quad (1)$$

and the charge current I will be represented by the formula $$I = \frac{Vcc \cdot C}{t} \cdot \log e \left(1 = \frac{Vc}{Vcc}\right) \quad (2)$$

As evident from the above mentioned formulas (1) and (2) and the characteristic curve (a) in FIG. 3, in the case of such CR charging system as in the conventional circuit, a comparatively long time will be required from the starting of charging the capacitors $C_1$ and $C_2$ until the voltage Vc between their terminals reaches a predetermined valve. Therefore, in the case of using this circuit, the shutter chance will be likely to be missed. In order to shorten this charging time, the capacity of the current source battery may be enlarged so that the maximum output current (charge current) may be increased (see the characteristic curve (c) in FIG. 3). However, in the case by such process, a disadvantage that the current source battery will have to be large will occur.

SUMMARY OF THE INVENTION

A primary object of the present invention is to provide a controlling circuit for electric shutters of the above mentioned type wherein capacitors are made chargeable with a constant current to eliminate the above mentioned defects.

Another object of the present invention is to provide a controlling circuit for electric shutters of the above mentioned type wherein a pair of capacitors are made chargeable through one constant current circuit to simplify the circuit formation.

A further object of the present invention is to provide a controlling circuit for electric shutters of the above mentioned type wherein, to simplify the circuit formation, constant current circuit elements are so connected that, when a discharge current is made to flow from a capacitor to one driving coil, the discharge current may not flow into the other driving coil.

These and other objects of the present invention will become more apparent during the course of following detailed description and appended claims.

DESCRIPTION OF THE PREFERRED EMBODIMENTS

Figure 1:
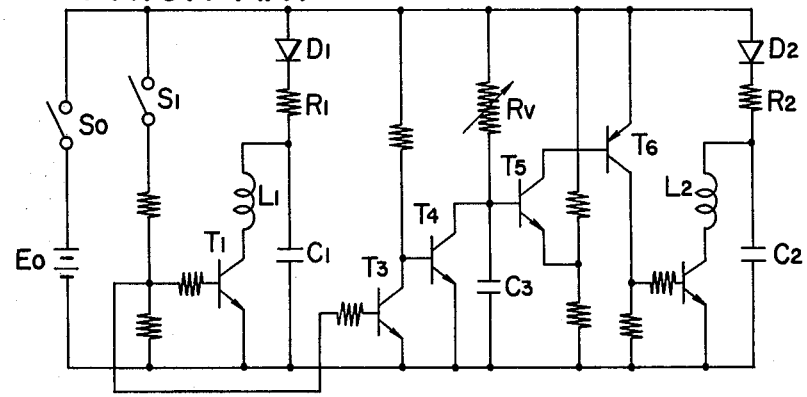
FIG. 1 is a wiring diagram showing a conventional example of an electric shutter controlling circuit related to the present invention.
Figure 2:
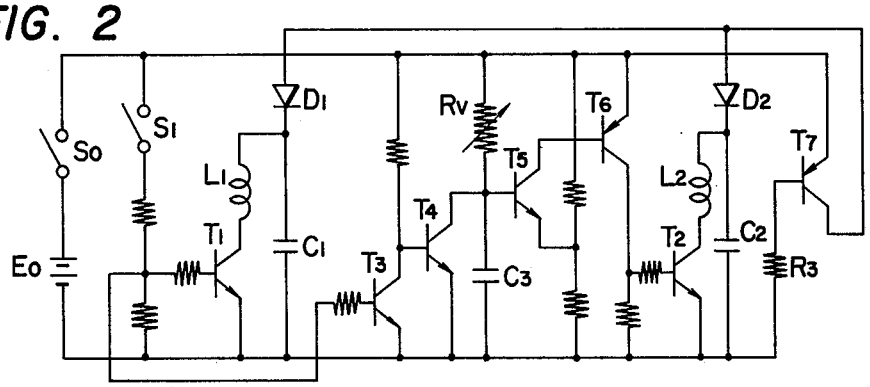
FIG. 2 is a wiring diagram showing an embodiment of an electric shutter controlling circuit according to the present invention.

FIG. 2 shows an embodiment of an electric shutter controlling circuit according to the present invention. This embodiment is fundamentally the same as the circuit shown in FIG. 1 except that a pair of capacitors $C_1$ and $C_2$ are respectively made to be charged through one constant current circuit.

Therefore, in this embodiment, the same corresponding symbols are used for the same elements as in FIG. 1 and the explanation of the general operation is omitted.

Figure 3:
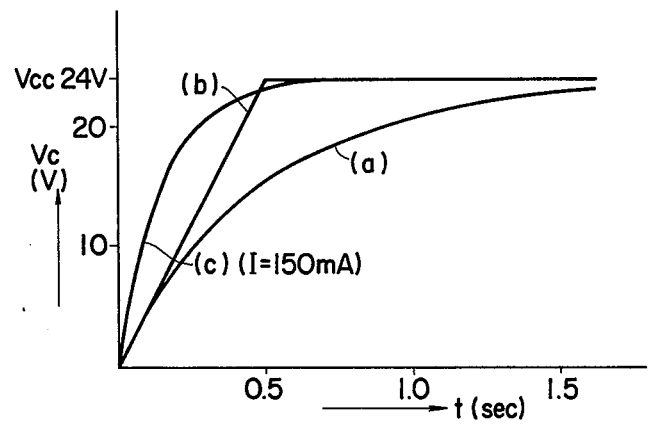
FIG. 3 is a diagram for explaining the charging characteristics of a capacitor.

Referring to FIG. 2, a constant current circuit consists of a transistor $T_7$ whose base is connected to a negative pole of a current source battery $E_0$ through a resistor $R_3$ and whose emitter is connected to a positive pole of the battery $E_0$ through a current source switch $S_0$. The output side of the constant current circuit, that is, the collector of the transistor $T_7$ is connected to a pair of capacitors $C_1$ and $C_2$ respectively through diodes $D_1$ and $D_2$. Therefore, according to this embodiment, the time t until charging the capacitors $C_1$ and $C_2$ is completed after the current source switch $S_0$ is closed is represented by the formula $$t = (Vcc.C)/I \qquad (3),$$

the charge current I is represented by the formula $$I = (Vcc.C)/t \qquad (4)$$

and the charging characteristics for the capacitors $C_1$ and $C_2$ are as shown by a straight line (b) in FIG. 3.

Now, in case the voltage Vcc of the current source battery $E_0$ is 24 V, the capacitance value C of the capacitors $C_1$ and $C_2$ is 1000 $\mu$F and the charge current (the maximum output current of the current source battery $E_0$) value I is 50 mA, according to such CR charging system as in the circuit of FIG. 1, as evident from the above mentioned formula (1), the charging time t required for the voltage Vc between the terminals of the capacitors $C_1$ and $C_2$ to reach a value of 95% of the current source voltage Vcc will be about 1.5 second (see the curve (a) in FIG. 3). On the other hand, according to such constant current charging system as in the circuit of FIG. 2, as evident from the above mentioned formula (3), the charging time t required for the voltage Vc between the terminals of the capacitors $C_1$ and $C_2$ to reach the value of the current source voltage Vcc may be about 0.5 second (see the curve (b) in FIG. 3). By the way, in order that the time until the voltage Vc between the terminals of the capacitors $C_1$ and $C_2$ reaches a value of 95% of the current source voltage Vcc by such CR charging system as in the circuit of FIG. 1, that is, the charging time t may be 0.5 second (see the curve (c) in FIG. 3), as evident from the above mentioned formula (2), the current source battery $E_0$ whose maximum output current I is 150 mA will be required.

As evident from the above explanation, according to such constant current charging system as in the present invention, in case a current source battery of the same capacity is used, the time required to charge the capacitors to a predetermined valve will be reduced to be ⅓ the time in the case of such CR charging system as in the conventional circuit. Also, in order that the time required until the completion of the chargeing may be the same, in the case of the constant current chargeing system, the current source capacity may by ⅓ that in the case of the CR charging system. This means that the circuit of FIG. 2 is very favorable as a controlling circuit for electric shutters.

Figure 4:
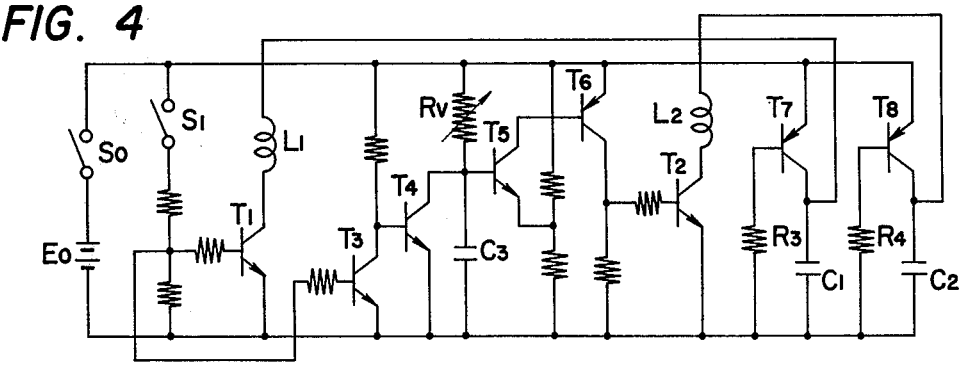
FIG. 4 is a wiring diagram showing another embodiment of an electric shutter controlling circuit according to the present invention.

FIG. 4 shows another embodiment of the present invention. This embodiment is different from the embodiment in FIG. 2 in respect that the constant current circuit to be utilized to charge the capacitor $C_1$ consists of the resistor $R_3$ and transistor $T_7$, the constant current circuit to be utilized to charge the capacitor $C_2$ consists of the resistor $R_4$ and transistor $T_8$, and the transistors $T_7$ and $T_8$ are to perform the same roles as of the diodes $D_1$ and $D_2$. That is to say, in this embodiment, the constant current circuits for the capacitors $C_1$ and $C_2$ are provided independently of each other so that, when the capacitor $C_1$ is discharged, its discharge current may be prevented by the transistor $T_7$ from flowing into the driving coil $L_2$ and, when the capacitor $C_2$ is discharged, its discharge current may be prevented by the transistor $T_8$ from flowing into the driving coil $L_1$. As the fundamental formation and operation of this embodiment are also the same as of FIG. 2, the same corresponding symbols are attached to the same or similar elements and the explanation of the operation shall be omitted.

I claim:

1. A controlling circuit for electric shutters comprising a first capacitor, a first driving coil connected to said first capacitor, a first switching means connected between said first capacitor and first driving coil and capable of flowing a discharge current to said first driving coil from said first capacitor when made to conduct to open a shutter, an exposure time controlling circuit connected to said first switching means, a second switching means connected to an output terminal of said exposure time controlling circuit and made to conduct by an electric current issued from said exposure time controlling circuit, a second driving coil connected to said second switching means and working to close the shutter when energized, a second capacitor connected between said second switching means and second driving coil and flowing a discharge current to said second driving coil to energize it when said second switching means is made to conduct, and a constant current circuit connected to said first and second capacitors to charge them.

2. A controlling circuit for electric shutters according to claim 1 wherein said constant current circuit consists of a transistor having a base connected to one terminal of each of said first and second capacitors and an collector connected to the other terminal of each of said first and second capacitors respectively through diodes, said diodes being made to serve to prevent a discharge current from said first capacitor from flowing into said second driving coil and to prevent a discharge current from said second capacitor from flowing into said first driving coil.

3. A controlling circuit for electric shutters according to claim 2 wherein a resistor is connected between the base of said transistor and said one terminal of each of said first and second capacitors.

4. A controlling circuit for electric shutters according to claim 1 wherein said constant current circuit consists of a first transistor having a base connected to one terminal of said first capacitor and a collector connected to the other terminal of said first capacitor and a second transistor having a base connected to one terminal of said second capacitor and a collector connected to the other terminal of said second capacitor, said first transistor being made to serve to prevent a discharge current from said first capacitor from flowing into said second driving coil, and said second transistor being made to serve to prevent a discharge current from said second capacitor from flowing into said first driving coil.

5. A controlling circuit for electric shutters according to claim 4 wherein resistors are connected respectively between the base of said first transistor and said one terminal of said first capacitor and between the base of said second transistor and said one terminal of said second capacitor.

* * * * *